UNITED STATES PATENT OFFICE.

BENJAMIN SCOBEL, OF NEW YORK, N. Y.

PROCESS FOR SOLIDIFYING CHINA-WOOD OIL AND THE PRODUCT THEREOF.

1,383,864.  Specification of Letters Patent.  Patented July 5, 1921.

No Drawing.  Application filed March 23, 1918. Serial No. 224,247.

*To all whom it may concern:*

Be it known that I, BENJAMIN SCOBEL, a citizen of the United States, residing at New York city, in the county of New York and State of New York, have invented certain new and useful Improvements in Processes for Solidifying China-Wood Oil and the Product Thereof; and I do hereby declare the following to be a full, clear, and exact description of the invention, such as will enable others skilled in the art to which it appertains to make and use the same.

This invention relates to the manufacture of a solid and more particularly to the solidification of oleaginous substances, such for instance as Chinese wood oil or tung oil.

The present invention has for its objects the provision of a method and the article produced thereby in which Chinese wood oil or tung oil is subjected to the action of an active haloid salt and it has also other objects in view as will be clear to those versed in the art from a perusal of the following specification relative to the process and the article forming the subject matter of my invention.

On grinding solid anhydrous ferric chlorid or its hydrates with Chinese wood oil or tung oil, a solid is produced which is non-coherent, yellow in appearance and which gradually darkens. The product so produced does not seem to possess useful properties in this state. However, I have found that the ferric chlorid can be ground in an indifferent oil such as rosin oil or linseed oil, and then quickly mixed and incorporated with the Chinese wood oil or tung oil to a homogeneous mass. The resulting mixture would become solid on warming and has fair mechanical properties. These solid products whether made by use of solutions of chlorids in anhydrous organic solvents or when produced by grinding the chlorid in other indifferent liquids, without actual solution taking place, have the following properties.

When allowed to solidify in glass or smooth metal molds or receptacles, they retain the shape of the container. The solidification is accompanied by a perceptible increase of temperature and in volume. These products are very glossy, opaque in bulk and jet black in appearance, translucent in thin sections, however. When first removed from mold or container, the solid substance is slightly tacky but soon loses this property on exposure to the atmosphere, or when kept at a temperature of about 90-100 degrees C. for a few hours. These solids are also very resilient when warm, and will rebound like a rubber ball. They become less resilient at low or ordinary temperatures and lose a good deal of this property on keeping them exposed to a temperature of 100 degrees C. for a long time. Prolonged exposure to elevated temperature has a hardening effect on the mass. The outer portions which are in contact with the atmosphere become very much firmer and tougher than the interior; similar to a skin formation. This outer hardened surface is also considerably more resistant to abrasion and puncture than the interior of the mass and perhaps always remains so. It is probable that the outer surface being exposed to the air or oxygen, oxidizes to a hard tough skin, while the interior not receiving this contact with the air cannot and is not similarly affected, although aging or keeping the mass in a warm atmosphere does have a perceptible influence on the mass as a whole. The jet black color of the solids produced by use of ferric chlorids and bromid is characterized by a deeper black color than those produced by the use of almost any other active chlorid on Chinese wood oil or tung oil. With zinc chlorid, the solid products are brown to deep red, sometimes they are translucent; aluminum chlorid gives a very deep brown to black.

The solids produced by using ferric chlorids or bromids are more susceptible to hardening and oxidation than those formed by most of the other active chlorids. The hydrates of aluminum chlorid appear to have very little action on Chinese wood oil or tung oil. The anhydrous chlorid in anhydrous acetone acts very energetically and produces similar bodies to ferric chlorids and bromids. Anhydrous ferric chlorid in anhydrous acetone also acts energetically, although very concentrated solutions are not possible owing to low solubility.

This chlorid ground in very small amounts of indifferent oils or liquids and then incorporated with Chinese wood oil or tung oil produces solid masses. I have found that with certain chlorids the speed of solidification is influenced by the kind of solvent. With anhydrous zinc chlorid, the action with Chinese wood oil or tung oil is not as energetic or reliable when ethyl or methyl alcohols are used as solvents for the chlorids, but in amyl acetate or alcohol it is more so.

If large quantities of amyl acetate or other solvents are used, as for instance, when very dilute solutions of active chlorids are employed, the resulting solid products are apt to develop cracks or fissures when seasoned in warm atmospheres, due to shrinkage on account of evaporation of escaping and trapped solvents. This is most marked with amyl acetate.

The solid products made by use of anhydrous zinc chlorid are similar in mechanical properties to those masses produced by using antimony chlorid, or bismuth chlorid, acetone being the solvent. These do not harden or oxidize as completely or as readily as do the ferric chlorids, bromids, or anhydrous aluminum chlorid masses. Also the presence of retained solvent influences the shearing and crushing strength more so than the ferric or aluminum products.

In this connection, it may be stated that useful products can be had by using mixed chlorids and mixed solvents, such as ferric chlorid hydrate with anhydrous aluminum chlorid in anhydrous acetone, or ferric chlorid hydrate and anhydrous zinc chlorid in acetone or other suitable solvent. I try to avoid the presence of moisture in my process for it has the tendency to decrease the resistance of the solids toward the mechanical forces.

I have found that substances which react chemically with the chlorids cannot be used as additions for the purpose of coloring or as fillers. Permissible substances can be added to the Chinese wood oil or tung oil and adding the solution of solidifying chlorid will render the entire mass solid. A few of these substances which prevent partial or complete solidification are:

The chrome yellow, white lead, oxids of zinc and lead, alkaline earth oxids, magnesium oxid, most hydroxids and sulfids, ultramarine blue, powdered metals lithopone, anilin and many aromatic substances. A few of the permissible additions are: insoluble silicates and earth, Prussian blue, graphite, ocher, umber, sienna, iron oxids, chromium oxid, silica all forms, wood flour, cork flour, rosin, ester gum and other easily oil soluble gums.

I have found that rosin and ester gum (a glycerid of resin acids) or other easily oil soluble gums can be profitably employed up to 40% by weight of Chinese wood oil or tung oil used, either dissolved by gentle heat in oil or ground with the Chinese wood oil or tung oil mechanically. When quantities in excess of 40% are employed the product is deficient in resiliency, is quite brittle and softens at temperature somewhat above room temperature.

Chinese wood oil or tung oil that has been thickened by use of air or in conjunction with raw Chinese wood oil or tung oil or with Chinese wood oil or tung oil containing rosin or ester gum can be used in my process.

Chinese wood oil or tung oil fatty acids can be solidified by use of active chlorids in anhydrous solvent, but preferably in conjunction with raw or blown Chinese wood oil or tung oil, or Chinese wood oil or tung oil containing rosin or ester gum. Chinese wood oils or tung oils that have been partially polymerized by prolonged heating or at very high temperatures are unsuitable for use in my process because products solidified from these oils will soften and grow sticky at comparatively low temperatures. Chinese wood oil or tung oil that has been heated above the polymerization point with small amounts of sulfur can be solidified in the usual manner.

When using straight Chinese wood oil or tung oil, 20 grams oil required $\frac{1}{2}$ c. c. 20% solution of ferric chlorid hydrate in anhydrous acetone, to cause solidification. As much as 3 c. c. can be used on that quantity of oil and a firmer product secured. When using Chinese wood oil or tung oil containing rosin or ester gum somewhat larger amounts of solution or stronger solution can be employed. Although the same amount of solution will solidify the same weight of Chinese wood oil or tung oil rosin mixture, as of straight raw Chinese wood oil or tung oil, when very large quantities of ferric chlorid are used or when chlorid is used in large excess of that required to secure a firm solid product, the Chinese wood oil or tung oil becomes solid but hydrochloric acid is formed and vapor being trapped tends to produce a solid mass deficient in mechanical properties.

Usually most additions such as rosin, wood flour, cork, fillers and coloring minerals exercise a retarding influence on solidification; and in working formulæ it is found desirable to use larger amounts of ferric chlorid solution or stronger solutions in such compositions.

A formula suitable for slabs, for tile or flooring, etc., is:

80 grams Chinese wood oil or tung oil, 20 grams rosin, dissolved by warming or ground in mechanically,
  12½ grams infusorial earth,
  12½ grams wood or cork flour,
  12½ grams oxid of iron, (red,)
  10 cubic centimeters of pure ferric chlorid hydrate in anhydrous acetone,
  Solution made up as follows:
  50 grams ferric chlorid $6H_2O$,
  50 grams acetone, anhydrous.
  Another formula:
  100 grams Chinese wood oil or tung oil containing 40% rosin, 50 grams Chinese wood oil or tung oil containing 10% ester gum,
5 grams cork meal,
5 grams wood flour,
10 grams Indian red,
20 grams magnesium silicate or other mineral filler.
10 cubic centimeters solution made as follows:
$Fe_2Cl_6.12H_2O$—100 grams,
Anhydrous acetone—33⅓ grams.

When operating on pure Chinese wood oil or tung oil without fillers or additions of any kind, the Chinese wood oil or tung oil can be made to solidify, with difficulty, however, and though accelerated by warming, when less than ¼ c. c.—20% ferric chlorid $6H_2O$ in anhydrous acetone per 20 grams of oil is used. The solid mass is quite translucent and of poor mechanical properties.

One half c. c. of this 20% solution solidifies Chinese wood oil or tung oil quite readily. Using one c. c. 20% solution, the Chinese wood oil or tung oil mass is quite firm, tough and opaque; can be hardened still more by keeping in a warm place for twenty-four hours or over. Stannic chlorid anhydrous in cooled anhydrous acetone also produces an active sodifying solution. The pure fuming anhydrous chlorids of tin or antimony cannot be used in this condition for their action on Chinese wood oil or tung oil is too energetic. Much weaker solutions of these liquid chlorids in an indifferent solvent such as benzin or like inert solvent, cause clotting or non-uniform solidification. Adding solutions of these chlorids first to very small amounts of indifferent oils such as rosin oil or castor oil and allowing these to absorb the chlorid and then adding to the Chinese wood oil or tung oil will solidify it and produce fair properties in the masses.

Or the fuming chlorids can be changed to their corresponding hydrates by adding the correct quantity of water and crystallizing the hydrated salt, which when dry can be dissolved in anhydrous solvent and used as the solidifying solution, which produces satisfactory masses.

When using ferric chlorid hydrate as my solidifying solution, I prefer to have this of concentrations varying from 20-50% strength or stronger, in some cases depending as to whether I use rosin, fillers, etc. Usually these solid products containing rosin oxidize or harden on the exterior to a firmer and tougher surface than without rosin.

Using liquid anhydrous tetrachlorid of tin as the solidifying chlorid, I proceed as follows: 22 c. c. $SnCl_4$ dissolved in 100 c. c. anhydrous acetone.

Formula for colored solid product: 100 grams Chinese wood oil or tung oil, (raw,) 50 grams Chinese wood oil or tung oil, containing 40% rosin, 5 grams cork meal, 5 grams wood flour, 20 grams asbestin, 20 grams Indian red, ground through paint mill. Add to this with thorough agitation 15 c. c. above solution.

*Details of procedure.*

Operating with straight raw Chinese wood oil or tung oil, or Chinese wood oil or tung oil containing rosin or ester gum, I weigh out the oil, then measure out the requisite quantity of solidifying solution or solution of active chlorid stirring and agitating the mixture thoroughly. I allow this to remain in the container until the mechanically trapped air rises to surface of mixture, at room temperature or I may subject this mixture to a vacuum to rid the mixture of trapped air more thoroughly and expeditiously.

I then place the mold containing the mixture in a warm place, temperature about 80-100° C. when the mass becomes solid.

If I desire a mass that is very firm or dense I subject the solidified mass at this stage to pressure, and keep it there for some hours. I may then remove same from warm place and allow mass to cool to room temperature when I remove from mold. I may still further harden mass by keeping it in an atmosphere of 80-100° C. for at least twenty-four hours.

Operating with formulæ requiring the use of coloring matter of fillers, I prefer to grind these with oil through a paint mill and treat the resulting paste with solution of active chlorid and proceed as above.

The solid masses produced by my process have the following properties:

These masses from pure raw Chinese wood oil or tung oil containing a solution of active chlorid, without additions are usually jet black in color, lustrous or dull depending on the character of the mold, they are resilient and elastic; very tough and high in crushing strength, and resistant toward abrasion, particularly is this true after seasoning at 150-212 degrees F. for twenty-four hours or more.

These masses have no definite melting point, will burn gently but will not melt. They are not readily affected by dilute alkalis or acids; strong solvents have a softening action, but do not dissolve. The toughness and crushing strength decreases with increase of temperature. They are thoroughly water resistant and water repellent.

I found that ferric bromid acts similarly to the chlorids and it is possible that other halogen derivatives of the heavy metals are also active. When the concentration of ferric chlorid in acetone is high—above 30%— the solidification of the Chinese wood oil or tung oil is almost immediate.

What is claimed is:

1. That process wherein an active metallic halogen derivative is thorougly disseminated through China wood oil.

2. That process wherein an active metallic halogen salt is thoroughly disseminated through China wood oil.

3. That process wherein an active hydrated metallic halogen derivative is thoroughly disseminated through China wood oil.

4. That process wherein an active metallic chlorid is thoroughly disseminated through China wood oil.

5. That process wherein a polyhalogen derivative of a heavy metal is thoroughly disseminated through China wood oil.

6. That process wherein ferric chlorid hydrate is thoroughly disseminated through China wood oil.

7. That process wherein an active metallic halogen derivative is thoroughly disseminated through China wood oil by means of a vehicle.

8. That process wherein an active metallic halogen derivative is thoroughly disseminated through China wood oil by means of an anhydrous vehicle.

9. That process wherein an active metallic halogen derivative is thoroughly disseminated through China wood oil by means of an anhydrous vehicle chemically indifferent to both the oil and the reagent.

10. That process wherein an active metallic halogen derivative is thoroughly disseminated through China wood oil by means of solution in a vehicle.

11. That process wherein an active metallic halogen derivative is thoroughly disseminated through China wood oil by means of mixture with a vehicle.

12. That process wherein an active metallic halogen derivative is thoroughly disseminated through China wood oil at normal temperature and the product then seasoned by exposure to air at a slightly increased temperature.

13. That process wherein an active metallic halogen derivative is thoroughly disseminated through China wood oil, and the product seasoned by exposure to the air with the application of pressure and heat.

14. A solid produced by thoroughly disseminating an active metallic halogen derivative through China wood oil by any suitable means, having no definite melting point, which increases the resiliency with increase in temperature, and which is susceptible to further toughening by exposure in air and moderate heat.

15. A solid formed at ordinary temperature and susceptible to further toughening by exposure to moderately heated air and consisting of a composition of China wood oil and as an active metallic halogen derivative.

In testimony whereof I affix my signature.

BENJAMIN SCOBEL.